United States Patent [19]

Alsobrooks et al.

[11] Patent Number: 5,279,327
[45] Date of Patent: Jan. 18, 1994

[54] PRESSURE REGULATOR

[75] Inventors: Daniel E. Alsobrooks; Steven P. Finkbeiner, both of Bay City; Daryl O. Codling, Cass City, all of Mich.

[73] Assignee: Orbital Walbro Corporation, Cass City, Mich.

[21] Appl. No.: 938,383

[22] Filed: Aug. 31, 1992

[51] Int. Cl.[5] .............................................. F16K 17/06
[52] U.S. Cl. ................................... 137/510; 123/463; 251/85; 251/337
[58] Field of Search ................ 137/510, 315; 251/85, 251/86, 337; 123/457, 459, 463

[56] References Cited

U.S. PATENT DOCUMENTS

| | | | |
|---|---|---|---|
| 2,279,519 | 4/1942 | Paquin | 251/337 X |
| 3,241,805 | 3/1966 | Schumann | 251/85 |
| 3,511,270 | 5/1970 | Fehrenbach et al. | 137/510 |
| 4,231,347 | 11/1980 | Ohumi et al. | 137/510 X |
| 4,284,039 | 8/1981 | Bellicardi et al. | 123/463 |
| 4,327,767 | 5/1982 | Fehrenbach et al. | 137/510 |
| 4,708,117 | 11/1987 | Mesenich et al. | 123/533 |
| 4,742,845 | 5/1988 | Capoccia et al. | 137/510 |
| 4,825,835 | 5/1989 | Deweerdt | 123/463 |
| 4,928,729 | 5/1990 | Hornby | 137/510 |
| 5,076,320 | 12/1991 | Robinson | 137/510 X |

*Primary Examiner*—Stephen M. Hepperle
*Attorney, Agent, or Firm*—Barnes, Kisselle, Raisch, Choate, Whittemore & Hulbert

[57] ABSTRACT

A fluid pressure regulator of compact construction including an improved diaphragm-valve assembly interposed between a flow body and a second body cap element. The flow body has an inlet and outlet passage and a valve cavity with a centrally disposed ported valve insert to allow the regulated passage of fluid. Mounted to the flow body, the cap element confines a diaphragm of the diaphragm-valve assembly and houses an adjustable coil-spring biased against the assembly. The diaphragm-valve assembly includes a ring-shaped diaphragm element interlocated between a circular element central to the diaphragm and a diaphragm compression limiting clamp plate ring. The circular element has a central recess over the valve insert which houses a spring-backed self-aligning ball valve element having a flat chordal surface adjacent the insert. A convolute in the diaphragm element provides a more consistent effective area in relation to the valve stroke during operation improving pressure regulation and reducing stretching of the diaphragm preventing tearing, rupture or undesirable hysteresis.

5 Claims, 2 Drawing Sheets

PRESSURE REGULATOR

FIELD OF INVENTION

Fluid pressure regulators using spring-backed, flatted, ball valves controlled by resiliently biased diaphragms peripherally mounted in a regulator housing.

BACKGROUND AND FEATURES OF THE INVENTION

There are hundreds of pressure regulator designs dating back to the beginning of the mechanical age of steam engines and compressed air actuators. The present invention contemplates an improved regulator design which is more compact and has a lower height dimension. The ball valve element having a flat valve surface is self-aligning. An improved diaphragm is confined peripherally and centrally to limit the pressure responsive area as well as confine the diaphragm working area to a convolute shape which reduces stretching. In addition, the diaphragm and valve assembly are conveniently designed for a single tool assembly.

The diaphragm is designed for use with liquid fuel or air and is also compatible with the use of alcohol or oxygenated fuels.

Other objects and features of the invention will be apparent in the following description and claims in which the principles of the invention are set forth together with details to enable persons skilled in the art to practice the invention, all in connection with the best mode presently contemplated for the invention.

BRIEF DESCRIPTION OF THE INVENTION

A flow body with inlet and outlet passages has a valve cavity with a ported valve insert centrally disposed and provided with a flat valve surface. A second body is disposed on the flow body and confines a ribbed periphery of a diaphragm. The second body has a spring housing with a coil spring which bears against an assembly centrally of the diaphragm which confines the central portion of the diaphragm and carries a ball valve with a flatted surface to cooperate with a flat valve surface. A flat finger spring bears against the confined surface of the ball valve to stabilize the valve in the central assembly. A compression limiting plate covers the undersurface of the central area of the diaphragm which has an integral annular rib to interfit with an annular groove in the central assembly.

BRIEF DESCRIPTION OF THE DRAWINGS

DRAWINGS accompany the disclosure and the various views thereof may be briefly described as.

DETAILED DESCRIPTION OF THE INVENTION AND THE MANNER AND PROCESS OF USING IT

Figure 1:
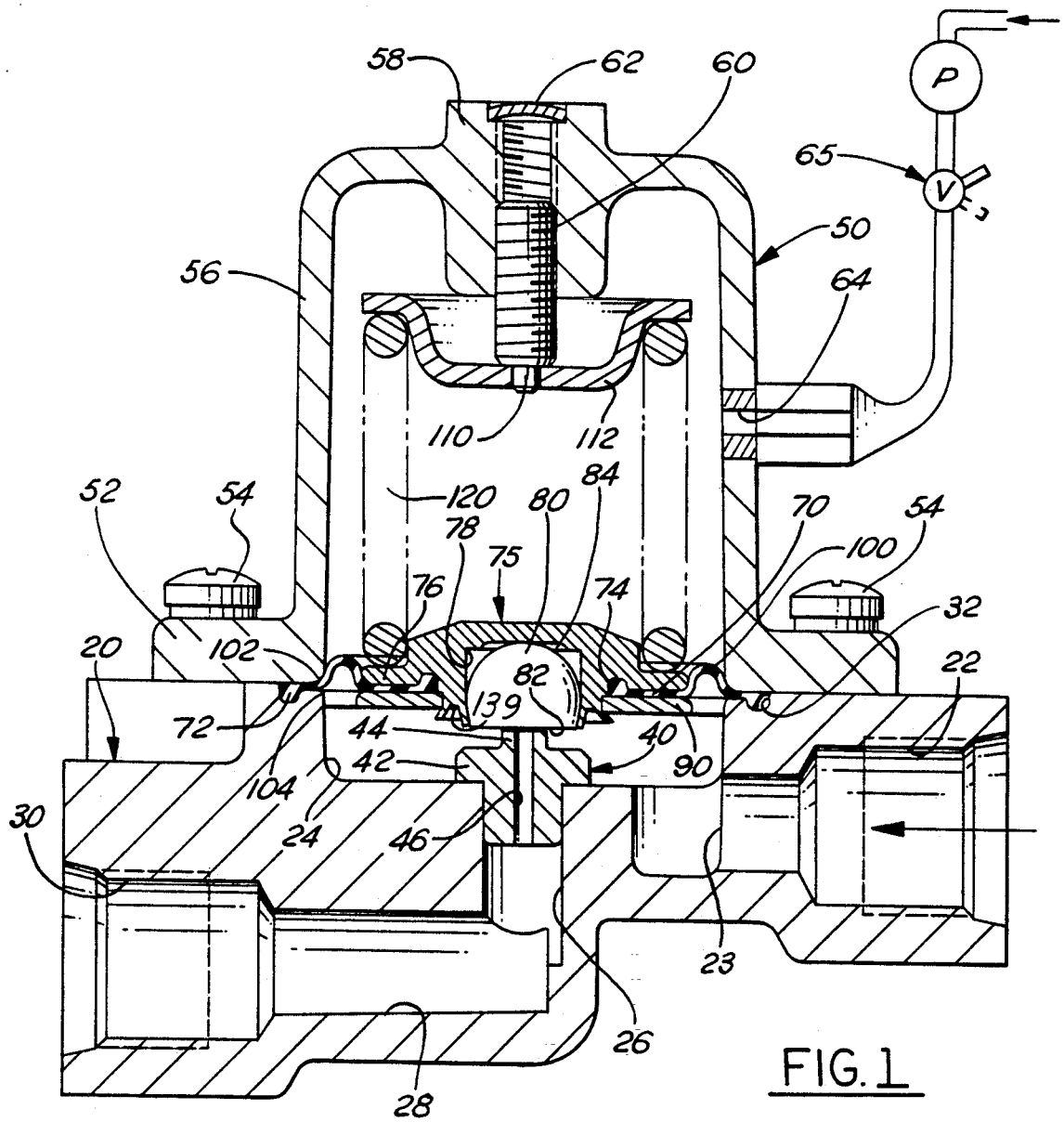
FIG. 1, a sectional view of an assembly of the pressure regulator valve.

WITH REFERENCE TO THE DRAWINGS, in FIG. 1, there is illustrated a sectioned view of a pressure regulator assembly. A base body 20 has a side inlet port 22 open to a passage 23 leading to a central shallow chamber 24 surrounding a central bore 26. The central bore 26 opens to an outlet passage 28 connected to a port 30. On the flat top surface of body 20, as viewed in FIG. 1, is an annular groove 32 spaced outwardly of the side wall of the chamber 24.

In the central passage 26 is mounted a valve insert 40 having a flange 42 which seats on the base of the chamber 24. A central boss 44 has a flat top which serves as a valve surface. A central passage 46 opens to passage 28 and to the chamber 24.

A second body cap element 50 has an outer flange 52 which is clamped to the upper surface of the base body 20 by headed screws 54. A hollow dome portion 56 rises from the flange 52 and is closed by an end shape 58 in which a threaded element 60 is disposed to serve as an adjustment for a coil spring to be described. A closure disc 62 limits access to the element 60. A small atmospheric port 64 is provided in the wall of the dome 56. This port 64 is connected to a pressure source P for air supply through a valve 65. The valve 65 can connect the port to atmospheric ambient pressure or to the air supply from the pump P. When used as a full pressure regulator, the port 64 is connected to the pump P which is a source for high pressure air supply in the system. The regulator compensates for air pressure changes and maintains a constant differential pressure across the fuel injector seat (not shown).

Figure 2:
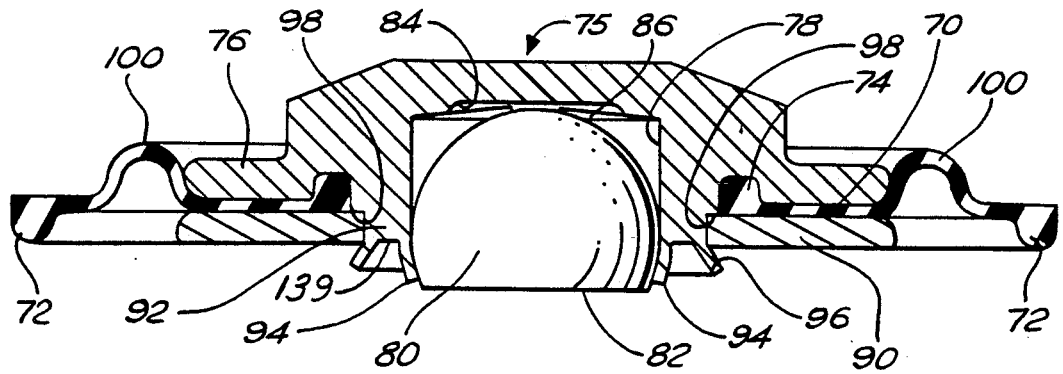
FIG. 2, a view of a central assembly of the valve carrier and diaphragm.

Next to be described is the diaphragm assembly shown in FIGS. 1 and 2. A diaphragm 70 has an outer periphery on which is formed an annular sealing bead 72. The diaphragm has a central opening around the periphery of which is a second sealing bead 74. Centrally of the diaphragm is a shaped circular element 75 which has an outer flange 76 to serve as a spring retainer and a raised central portion in which is formed a valve recess 78 in which is a ball valve element 80 having a flat chordal surface 82. A shallow recess 84 accommodates the fingers of a flat finger spring 86 shown best in FIG. 3. This spring is easy to install and is self-aligning.

A compression limiting clamp plate 90 in the form of a ring is positioned below the diaphragm around a depending boss 92 outside the valve recess 78. In assembly the annular edge of the boss 92 is split into two opposed flanges. A first flange 94 is formed around the lower portion of the ball above the flat 82 to retain the ball in recess 78. A second flange 96 is formed outwardly to overlie the inner edge of the plate 90 to press the plate against the inner periphery of the diaphragm. However, a ledge 98 limits the axial movement of the plate 90 and thus limits the compression of the inner periphery of the diaphragm to control the diaphragm squeeze. This feature eliminates inconsistencies which could result in inadequate compression to cause leakage or overstressing and failure of the diaphragm material.

The diaphragm has a single convolute 100 confined on the inside by the outer edge of the ring 90 and on the outside by the control surfaces 102 and 104 of the mating parts 20 and 52.

Confined on the tip 110 of element 60 is a spring retainer plate 112 which confines a coil spring 120 extending to the flange 76 of part 75. The compression on this spring can be controlled by threaded element 60 to set the desired regulated pressure.

The molded diaphragm with the confined convolute provides improved regulation performance due to a more consistent effective area in relation to the valve stroke. This is most important with respect to obtaining acceptable slope characteristics in the regulation of air. The need for low cost fuel and air regulators takes on importance as new technology, such as pneumatic assist fuel injectors, become more commonly used. The convolute confinement in the molded diaphragm 70 also serves to reduce stretching of the diaphragm which can lead to tearing and rupturing and also lead to hysteresis in the performance curve.

The flatted ball 80 offers significant economic and performance advantages. It can be ground using commercially available ball bearings. The flat provides increased contact surface area between the ball flat and the valve body which avoids line contact wear. Also, the center of gravity is coincidental to the rotational axis which minimizes the tendency for parallel alignment of the ball flat to the valve seat to change due to gravity or vibration. This permits the design to be mounted horizontally with no impact on performance.

Figure 3:
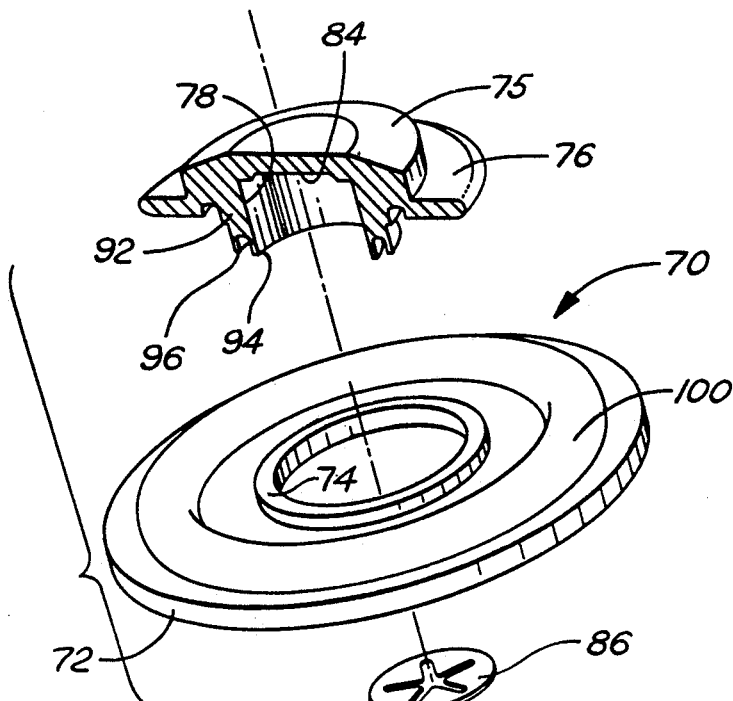
FIG. 3, an exploded view of the parts of the central assembly.
Figure 4:
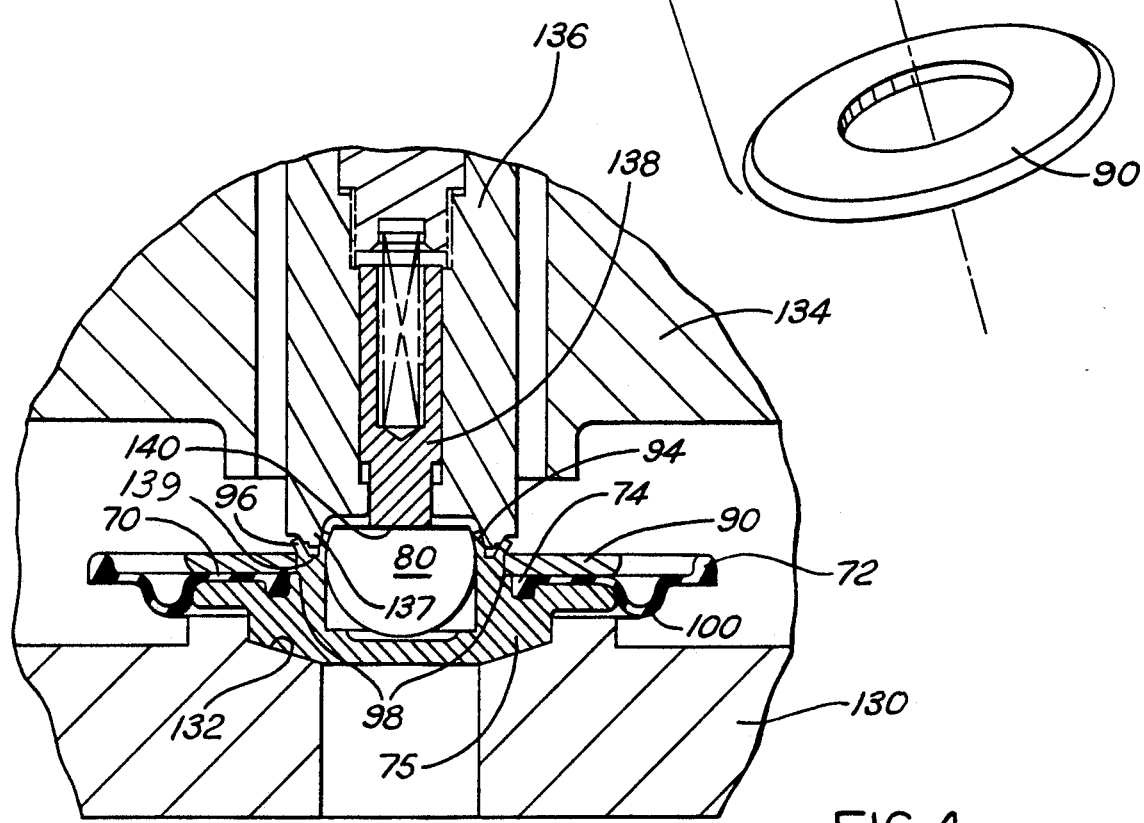
FIG. 4, a sectional view of an assembly fixture for the central assembly.

In FIG. 4, an assembly fixture is illustrated. This fixture is used to assemble the diaphragm parts 75, 70, 86, 80 and 90. As illustrated in FIG. 3, the lower edge of the depending boss 92 of part 75 is grooved to define an inner skirt 94 and an outer skirt 96. A die base 130 has a beveled recess 132 to receive the shaped surface of the element 75 and thus provide a solid base for the assembled parts, namely, the molded diaphragm, the disc 90, and the ball 80.

A top die mount 134 carries a reciprocal die plunger 136 which is suitably driven downwardly, mechanically or hydraulically. The plunger 136 has a wedge-shaped, annular former projection 137 which, in the assembly motion, enters the gap between the skirts 94 and 96 to form the inner skirt 94 around the wall of the ball 80 and to form the outer skirt 96 over the inner periphery of the ring 90. This skirt 96 retains the ring 90, and the ring 90 clamps the diaphragm and limits the compression on the inner portion of the diaphragm due to contact with ledge 98, FIG. 2.

The die plunger 136 has a spring-biased insert 138 with a flat end 140 to contact and position the flat side of the ball 80. The plunger travel is limited by a built-in stop at 139 between skirts 94 and 96 to control the crimp.

What is claimed is:

1. A pressure regulator of the type having a main body with an inlet and outlet and a valve seat interposed between the inlet and outlet, a secondary body affixed to said main body carrying a regulator spring, and a diaphragm-valve assembly interposed between said bodies comprising:

a diaphragm having an outer periphery clamped between contacting portions of said bodies, a center element in contact with said regulator spring overlying and mounted on an annular central portion of said diaphragm, said element having a central recess to overlie said valve seat, a clamp plate opposing said center element movable to a clamping position to clamp said annular central portion of said diaphragm, means to affix said clamp plate in said clamping position, means to limit the clamping motion of said clamp plate toward said center element to restrict the compression on said diaphragm, said valve seat having an axial passage positioned in said main body with a flat surface surrounding said axial passage, said axial passage connecting said inlet and said outlet, a ball valve in said central recess of said center element having a flat surface to contact said flat surface of said valve seat, and a flat finger spring in said recess bearing against a spherical surface of said ball valve axially opposed to said flat surface.

2. A pressure regulator as defined in claim 1 in which said diaphragm is a molded piece having a first annular bead at the outer periphery, and an annular groove in one of the contacting surfaces of said bodies to receive and retain said annular bead of said diaphragm.

3. A pressure regulator as defined in claim 2 in which said central element has an annular flat-sided flange extending outwardly of said recess to be in contact with said regulator spring and against which said clamp plate is positioned, and an annular groove in said flange, said diaphragm having a second annular bead receivable in said annular groove in said flange to confine said diaphragm radially, and a convolute in said diaphragm outside said flange and inside said first annular bead.

4. A pressure regulator as defined in claim 1 in which said center element has a depending boss surrounding said recess, and an annular flat-sided flange extending outwardly of said boss, said clamp plate being in the form of a ring surrounding said boss, said means to limit the clamping motion of said clamp plate comprising a ledge formed on said boss spaced from said flange.

5. A pressure regulator as defined in claim 4 in which said means to affix said clamp plate in clamping position comprises a bead on said boss formed over said plate to retain it against said ledge.

* * * * *